(12) United States Patent
Børsting

(10) Patent No.: US 12,297,804 B2
(45) Date of Patent: May 13, 2025

(54) WIND TURBINE STORAGE AND/OR TRANSPORT SYSTEM

(71) Applicant: Polytech A/S, Bramming (DK)

(72) Inventor: Kristian Børsting, Bramming (DK)

(73) Assignee: Polytech A/S, Bramming (DK)

( * ) Notice: Subject to any disclaimer, the term of this patent is extended or adjusted under 35 U.S.C. 154(b) by 0 days.

(21) Appl. No.: 17/927,191

(22) PCT Filed: Jun. 8, 2021

(86) PCT No.: PCT/EP2021/065316
§ 371 (c)(1),
(2) Date: Nov. 22, 2022

(87) PCT Pub. No.: WO2021/250011
PCT Pub. Date: Dec. 16, 2021

(65) Prior Publication Data
US 2023/0213020 A1    Jul. 6, 2023

(30) Foreign Application Priority Data

Jun. 9, 2020    (EP) ..................................... 20179096
Oct. 1, 2020    (EP) ..................................... 20199580
Apr. 29, 2021   (EP) ..................................... 21171162

(51) Int. Cl.
*F03D 13/40*    (2016.01)

(52) U.S. Cl.
CPC .......... *F03D 13/40* (2016.05); *F05B 2260/02* (2013.01)

(58) Field of Classification Search
CPC ....... F03D 13/40; F05B 2260/02; Y02E 10/72
See application file for complete search history.

(56) References Cited

U.S. PATENT DOCUMENTS

| 2018/0041895 | A1 | 2/2018 | Barcala et al. |
| 2020/0051015 | A1 | 2/2020 | Davis et al. |
| 2020/0092683 | A1 | 3/2020 | Fyfe et al. |
| 2020/0279446 | A1 | 9/2020 | Hage et al. |
| 2021/0062792 | A1* | 3/2021 | Kastrup .................. F03D 13/40 |
| 2021/0215139 | A1* | 7/2021 | Roodenburg ........... B66C 23/84 |

FOREIGN PATENT DOCUMENTS

| KR | 2013 0096784 A | 9/2013 |
| WO | WO 2019/129329 A1 | 7/2019 |
| WO | WO 2019/231329 A1 | 12/2019 |

OTHER PUBLICATIONS

International Search Report and Written Opinion for corresponding PCT Application No. PCT/EP2021/065316, mailed Aug. 6, 2021, 9 pages.

* cited by examiner

*Primary Examiner* — Joseph Ortega
(74) *Attorney, Agent, or Firm* — Crowell & Moring LLP

(57) ABSTRACT

The present invention relates to a wind turbine storage and/or transport system comprising a wind turbine storage and/or transport equipment, and an in-use/not in-use system to be arranged in connection with the wind turbine storage and/or transport equipment, the wind turbine storage and/or transport equipment being configured to support carry the wind turbine component, wherein the in-use/not in-use system comprises one or more detector device(s) being configured to determining a presence of the wind turbine component in or on the wind turbine storage and/or transport equipment.

18 Claims, 8 Drawing Sheets

WIND TURBINE STORAGE AND/OR TRANSPORT SYSTEM

CROSS-REFERENCE TO RELATED APPLICATIONS

Figure 1:
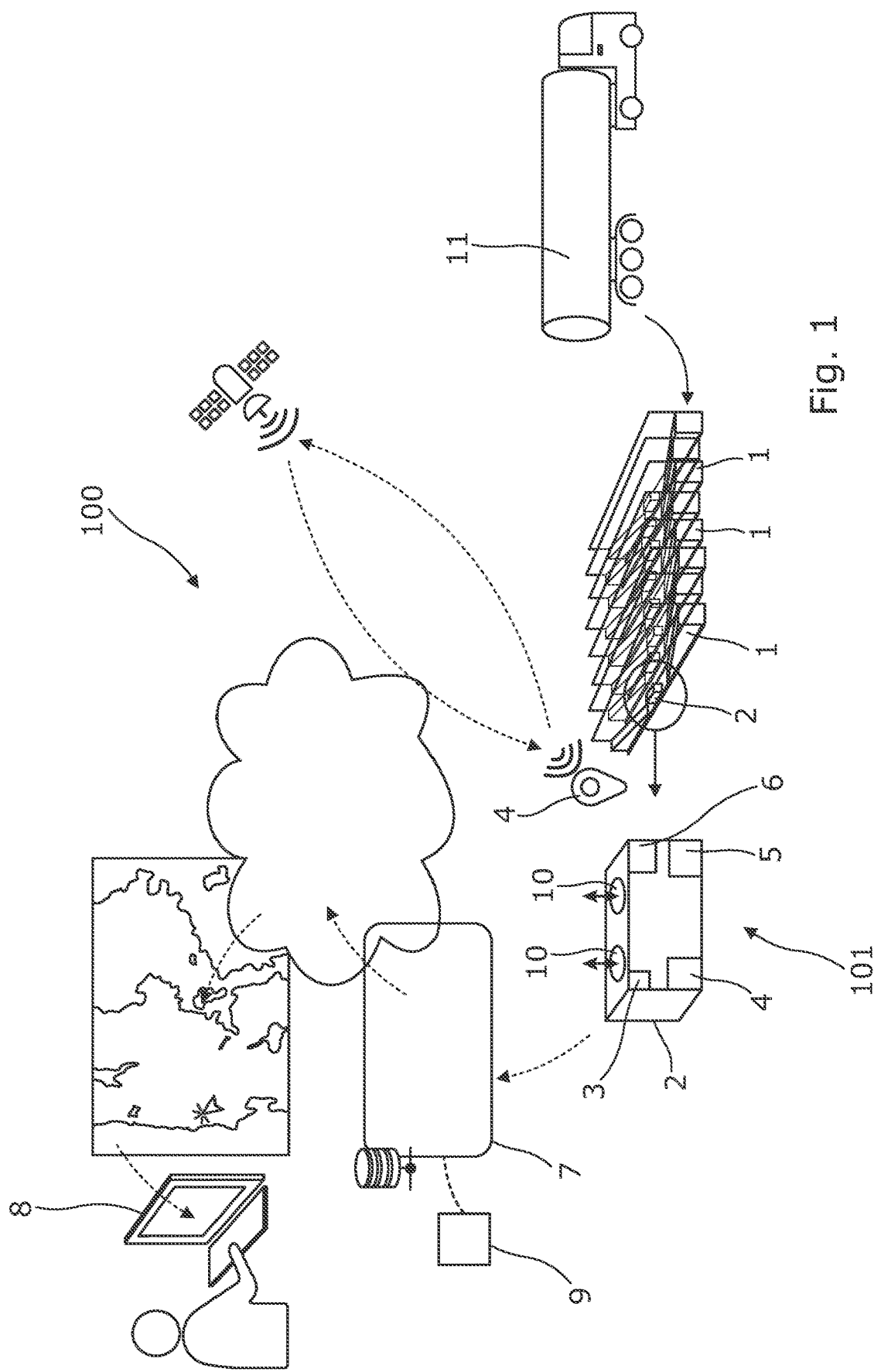

This application is a continuation of International PCT Application No. PCT/EP2021/065316, filed Jun. 8, 2021, which claims the benefit of priority to Application No. EP 20179096, filed Jun. 9, 2020 and Application No EP 20199580, filed Oct. 1, 2020 and Application No. EP 21171162.7, filed Apr. 29, 2021, where the entire contents of each are hereby incorporated by reference.

The present invention relates to a wind turbine storage and/or transport system comprising a wind turbine storage and/or transport equipment.

Manufactures of wind turbines and other manufactures of heavy equipment are transporting elements and goods to locations worldwide. When transporting heavy elements and components such as for instance towers, blades and nacelles, expensive and special carriers and other transport equipment are needed for protecting the elements and components during the transportation. When the elements and components are then installed on site, the carriers are left at the location, and the manufactures do not always have the overview of future transportation needs, and thereby ship the carriers to these positions. As a result, the carriers are left, forgotten, and eventually discarded.

The consequence may be that new expensive special carriers have to be ordered and produced to new transportation sites. This is very costly, and not environmentally friendly.

It is an object of the present invention to wholly or partly overcome the above disadvantages and drawbacks of the prior art. More specifically, it is an object to provide an improved wind turbine storage and/or transport system being able of determining status in an expedient manner.

The above objects, together with numerous other objects, advantages and features, which will become evident from the below description, are accomplished by a solution in accordance with the present invention by a wind turbine storage and/or transport system comprising
  a wind turbine storage and/or transport equipment, and
  an in-use/not in-use system to be arranged in connection with the wind turbine storage and/or transport equipment,
  the wind turbine storage and/or transport equipment being configured to support a wind turbine component, wherein the in-use/not in-use system comprises one or more detector device(s) being configured to determine a presence of the wind turbine component in or on the wind turbine storage and/or transport equipment.

By applying the present invention, a wind turbine storage and/or transport system is obtained wherein the use of wind turbine storage and/or transport equipment may be optimized, meaning that the specific wind turbine storage and/or transport equipment may be observed so that it may be returned to reuse and thereby a higher coefficient of utilization for the specific wind turbine storage and/or transport equipment is obtainable. The investment in new wind turbine storage and/or transport equipment may also be minimized accordingly by the application of the wind turbine storage and/or transport system according to the present invention.

The one or more detector device(s) may be configured to determine, on basis of the determined presence of the wind turbine component, that the wind turbine storage and/or transport equipment is in-use or not in-use.

Furthermore, the one or more detector device(s) may comprise a camera configured to take a photo and/or video of the wind turbine storage and/or transport equipment, the camera may be configured to take a photo and/or video at predetermined time intervals or being event-driven.

The photo and/video may then be processed by for instance an image recognition software for determining a presence of the wind turbine component in or on the wind turbine storage and/or transport equipment for determining the status of the specific wind turbine storage and/or transport equipment.

Moreover, the one or more detector device(s) may comprise a contact sensor for detecting a physical contact between wind turbine storage and/or transport equipment and wind turbine component and hence determining the status of the specific wind turbine storage and/or transport equipment.

Also, the one or more detector device(s) may comprise a chip radio communication unit being configured to establish a radio-frequency communication between a component chip arranged in the wind turbine component and an equipment chip arranged in the wind turbine storage and/or transport equipment for detecting the presence of the wind turbine component in or on the wind turbine storage and/or transport equipment and hence determining the status of the specific wind turbine storage and/or transport equipment. The chip radio communication unit is configured to communicate with the component chip and the equipment chip at predetermined time intervals or being event-driven.

The one or more detector device(s) may be configured to detect the presence of the wind turbine component in or on the wind turbine storage and/or transport equipment at predetermined time intervals or being event-driven.

In addition, the one or more detector device(s) may comprise one or more sensor(s) configured to detect a distance to and/or a load of a wind turbine component, the one or more sensor(s) is/are configured to detect the distance and/or load at predetermined time intervals or being event-driven.

The one or more sensors may be an ultrasonic sensor, a Time of Flight sensor, an infrared sensor, a proximity sensor, a magnetometer sensor, a load cell sensor, a strain gauge, a radar sensor, a lidar sensor, an acceleration sensor, a photo sensor or a combination thereof.

Also, a temperature sensor may be arranged in the one or more detector device(s).

Furthermore, the radar sensor may be a pulsed coherent radar or a Frequency-Modulated Continuous Wave sensor, or a combination thereof.

Moreover, the radar sensor may comprise a transmitter being configured to sending radar pulses and a receiver being configured receiving echoes.

In addition, the radar sensor may be configured to shut down the transmitter between radar pulses achieving lower power consumption.

The distance may be calculated by measuring a time from when the radar pulse is sent to when the radar echo is received.

Additionally, the radar sensor may be configured to only consume power while sending the radar pulse and when receiving the echo.

Also, a lens may be arranged in connection with the radar sensor, the lens is configured to control a direction of the radar pulses.

Furthermore, the one or more detector device(s) may further comprise a communication unit configured to communicate data.

The one or more detector device(s) may also comprise a positioning unit.

Moreover, the one or more detector device(s) may comprise an identification.

The identification may be a unique number or tag for the specific detector device so that this can be identified in the user interface.

The one or more detector device(s) may also comprise a RFID tag or label enabling that the detector device may locally be identified by RFID reader or by visual inspection.

Furthermore, the one or more detector device(s) may comprise a power supply. The power supply unit may be a battery pack.

In addition, the wind turbine storage and/or transport equipment may be configured to support the wind turbine component during transport and/or storage of the wind turbine component.

Also, the in-use/not in-use system may comprise a storage device configured to store data communicated from the one or more detector device(s) regarding status of the wind turbine storage and/or transport equipment and/or position of the one or more detector device(s).

The storage device may be a cloud-based server implemented using any commonly known cloud-computing platform technologies, such as e.g. Amazon Web Services, Google Cloud Platform, Microsoft Azure, DigitalOcean, Oracle Cloud Infrastructure, IBM Bluemix or Alibaba Cloud. The cloud-based server may be included in a distributed cloud network that is widely and publicly available, or alternatively limited to an enterprise. Alternatively, the storage device may in some embodiments be locally managed as e.g. a centralized server unit. Other alternative server configurations may be realized, based on any type of client-server or peer-to-peer (P2P) architecture. Server configurations may thus involve any combination of e.g. web servers, database servers, email servers, web proxy servers, DNS servers, FTP servers, file servers, DHCP servers, to name a few.

The storage device may be maintained by and/or configured as a cloud-based service, being included with or external to the cloud-based server. Connection to cloud-based storage means may be established using DBaaS (Database-as-a-service). For instance, cloud-based storage device may be deployed as a SQL data model such as MySQL, PostgreSQL or Oracle RDBMS. Alternatively, deployments based on NoSQL data models such as MongoDB, Amazon DynamoDB, Hadoop or Apache Cassandra may be used. DBaaS technologies are typically included as a service in the associated cloud-computing platform.

The storage device may be a server having one or more drives, such as for instance solid state drives, or similar drives. The storage device may also be a combination of a virtual server and a local hard drive.

The stored data from the one or more detector device(s) may be accessible via a user interface.

The in-use/not in-use system may comprise a control unit.

Moreover, the control unit may be configured to process the data received from the one or more detector device(s).

Additionally, the control unit may be configured to communicate data to the one or more detector device(s).

Furthermore, the control unit on basis of the data from the one or more detector device(s) may be configured to identify a status and/or the position of the one or more detector device(s).

In addition, the control unit on basis of the data from the one or more detector device(s) may be configured to identify a status of the wind turbine storage and/or transport equipment and/or the position of the one or more detector device (s).

Moreover, the communication unit is configured to communicate data comprising one or more of the following
  status of the wind turbine storage and/or transport equipment,
  the identification of the one or more detector device(s),
  position of the one or more detector device(s), and/or
  a power level of the power supply,
  at predetermined intervals or being event-driven.

The control unit may also be configured to detect material of the wind turbine component based on the measurements of the radar sensor. Hereby is obtained that the control unit when measuring the distance to the wind turbine component can detect which material the wind turbine component is and also whether the one or more detector device(s) is/are partially covered with debris, leaves, snow, etc., so that it is ensured that it is the intended distances which is being measured.

In addition, the control unit may be configured to determine on basis of the detected distance one of the following situations:
  the one or more sensors are covered,
  the wind turbine storage and/or transport equipment is in-use,
  the wind turbine storage and/or transport equipment is in a stacked position,
  the wind turbine storage and/or transport equipment is not in-use.

The sensor may be configured to detect the distance up to at least 100 cm with an accuracy of 5 cm or lower.

Furthermore, the in-use/not in-use system determines if the wind turbine storage and/or transport equipment is in use or not in use on basis of the one or more detector devices detecting either distance and/or load, the photo and/or video taken, the physical contact and/or by radio-frequency communication between component chips and equipment chips.

Furthermore, the distance may be detected from the sensor of the one or more detector device(s) to a face of the wind turbine component.

In addition, the one or more detector device(s) may be arranged so that the wind turbine component is positioned on, above or in front of the one or more detector device(s).

Also, the one or more detector device(s) and the control unit may be operatively connected.

Moreover, the positioning unit may be based on GNSS signals. Additionally, the position may be determined by local identification of mobile telephone network positions or by internet network positions or by using GPS signals.

In addition, the communication unit may be configured to communicate with a low power, long range (LR), wireless wide area network (LPWAN), such as NB-IoT, Sigfox, LoRa, ZigBee, Z-Wave, Wireless M-bus, Bluetooth, GPRS, GSM, 3G, 4G, 5G, nG, NFC, or similar wireless technology.

Also, the communication unit may be configured to communicate via fully or partly a wireless mesh network (WMN).

Furthermore, the communication unit may comprise an operator driven gateway and/or an open source driven gateway.

The communication unit may also be configured to function as a local gateway so that the communication unit may be set up to communicate even in remote areas.

Also, the communication unit may be configured to receive and transmit data.

Moreover, the one or more detector device(s) may comprise a casing, the casing may be watertight. The casing may be made of polyurethane (PUR), TBU or ABS material or a combination thereof.

In addition, the one or more detector device(s) may be operable in temperatures from −40 degrees to 60 degrees Celsius.

Furthermore, the one or more detector device(s) may be configured to receive data wireless from one or more secondary sensors. The secondary sensors may for instance communicate via Bluetooth and/or other long range (LR) communication technologies such as LoRa networks.

The secondary sensor(s) may be humidity sensor, acceleration sensor, gas sensor, temperature sensor, vibration sensor, UV sensor, strain gauge, or a combination thereof.

The secondary sensors may be configured to provide data regarding which impacts and/or loads the wind turbine components and/or the wind turbine storage and/or transport equipment have been exerted for in addition to where and when these impacts and/or loads have occurred.

For instance, the vibration sensor may provide data on the impacts exerted on the wind turbine storage and/or transport equipment or the wind turbine component. By this data it is possible to redesign for instance the wind turbine storage and/or transport equipment in view of strength and thereby reduce the material used for the wind turbine storage and/or transport equipment. In addition, when the operator can document the impacts and/or loads exerted it may be used to classification companies and/or insurance companies for inter alia having a lower insurance premium.

The acceleration sensor may provide data regarding the speed and other related loads by which the wind turbine storage and/or transport equipment or wind turbine component have been exerted for.

In addition, the humidity sensor may provide data regarding when and where the humidity increase and/or decrease. This data may for instance be used to optimise the wind turbine component and thereby ensuring that the humidity does not inflect on the wind turbine component.

The UV sensor may detect the level of UV wind turbine component and/or the wind turbine storage and/or transport equipment have been exerted for. Hereby it is possible to monitor when different parts of the wind turbine component and/or the wind turbine storage and/or transport equipment should be replaced for ensuring proper function.

Moreover, the strain gauges may provide data regarding the loads exerted on the wind turbine component and/or the wind turbine storage and/or transport equipment. For instance, by measuring loads by use of strain gauges positioned at different position on for instance a prototype of the wind turbine component and/or the wind turbine storage and/or transport equipment, it is possible to get data of which parts and areas of the wind turbine component and/or the wind turbine storage and/or transport equipment which are exerted for different loads, whereby the wind turbine component and/or the wind turbine storage and/or transport equipment may be dimensioned and designed to withstand these loads in an optimum manner.

The one or more detector device(s) may be configured to go into an idle mode for a predetermined time when the communication unit is unable to communicate.

Advantageously, the wind turbine storage and/or transport equipment may be a carrier, cradle, jig, support part, each being configured to support a wind turbine component.

Furthermore, the wind turbine component may be a wind turbine blade, a wind turbine blade section, a tower section, a nacelle, a gearbox, or parts thereof.

The present invention also relates to an in-use/not in-use system configured to form part of the wind turbine storage and/or transport system as described above.

The present invention additionally relates to a method for identifying a status of a wind turbine storage and/or transport equipment in a wind turbine storage and/or transport system as described above, comprising arranging one or more detector device(s) of an in-use/not in-use system in relation to a wind turbine storage and/or transport equipment, and determining a presence of a wind turbine component in or on the wind turbine storage and/or transport equipment.

In addition, the method may further comprise determining, on basis of the determined presence of the wind turbine component, that the wind turbine storage and/or transport equipment is in-use or not in-use.

Furthermore, the method may also comprise one or more of the following steps:

detecting a position of the one or more detector device(s) having an identification, communicating status, identification, position to a storage device at predetermined intervals or being event-driven, storing data regarding status, identification and/or position.

Furthermore, the method may comprise making the data available by means of a user interface so that wind turbine storage and/or transport equipment may be tracked in real-time or at the predetermined time intervals or being event-driven, via the one or more detector device(s).

Figure 2:
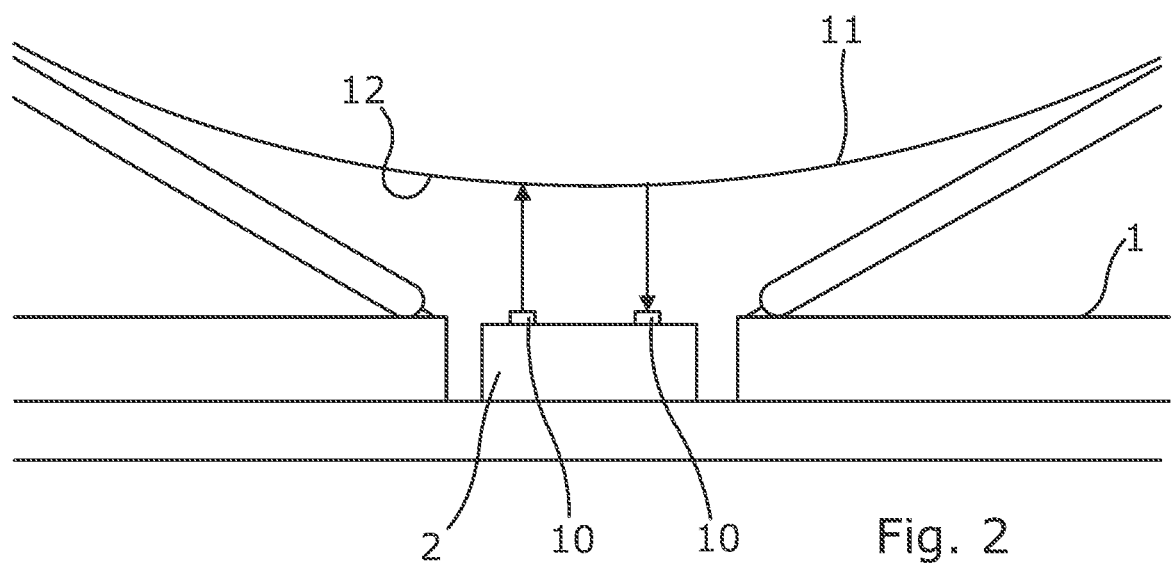
Figure 3:
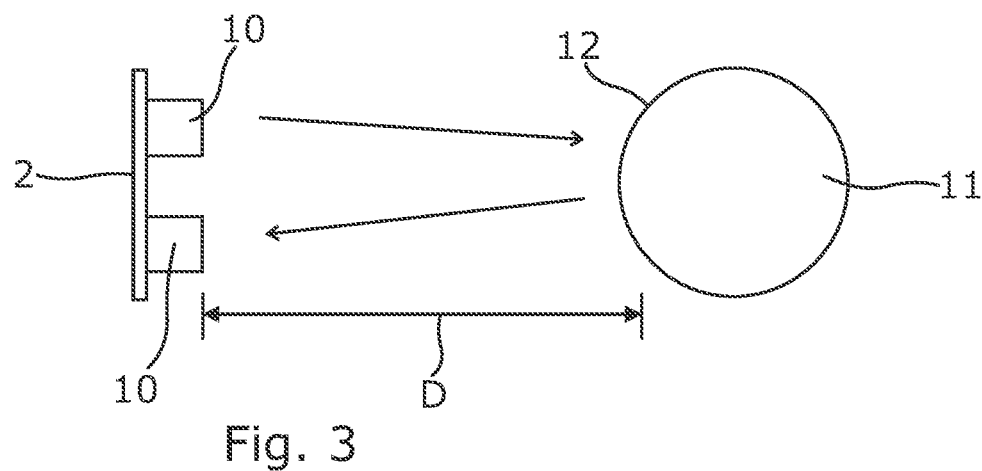
Figure 4:
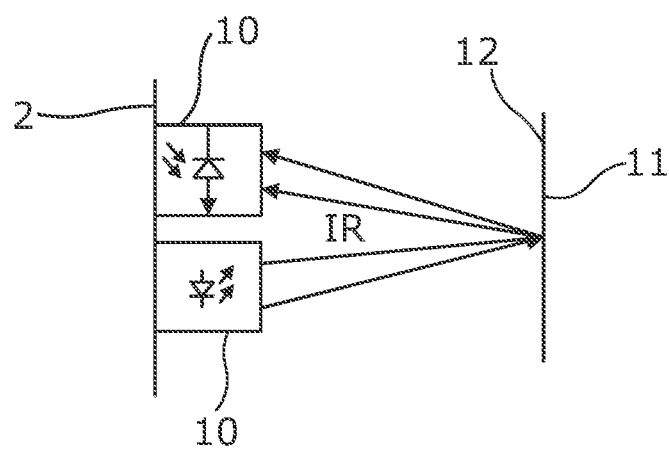
Figure 5:
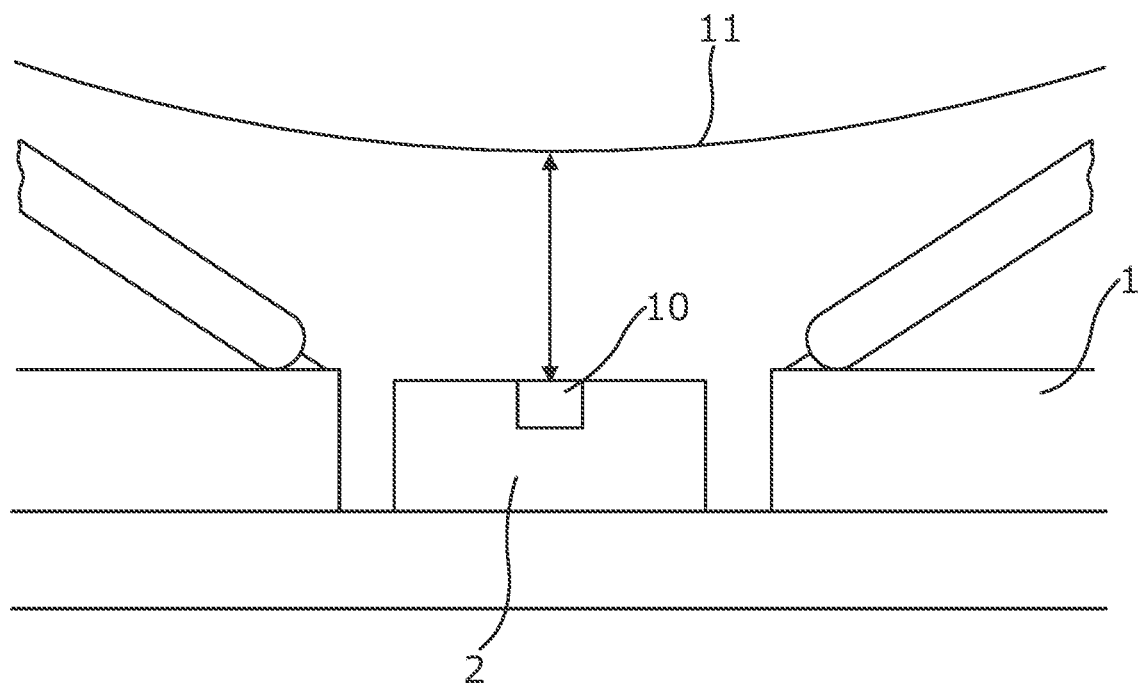
Figure 6:
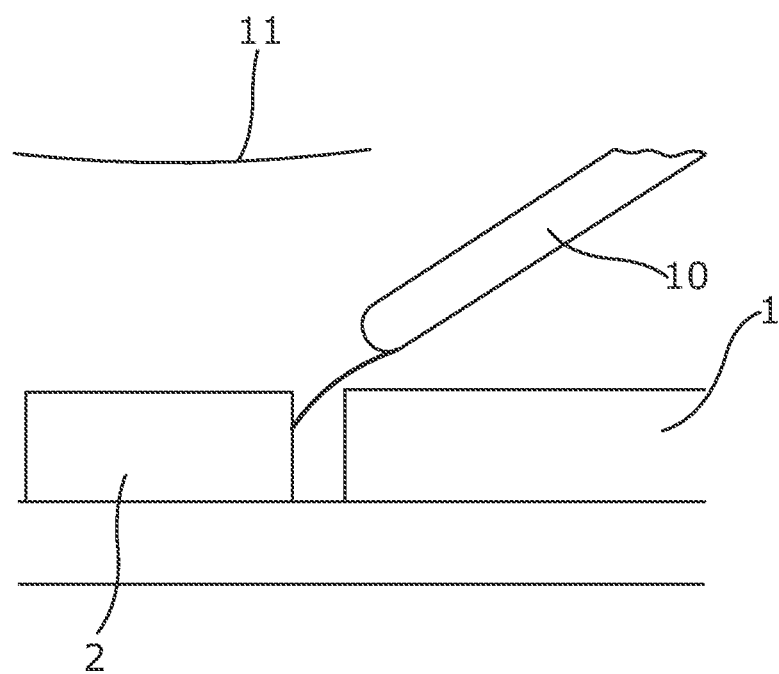
Figure 7:
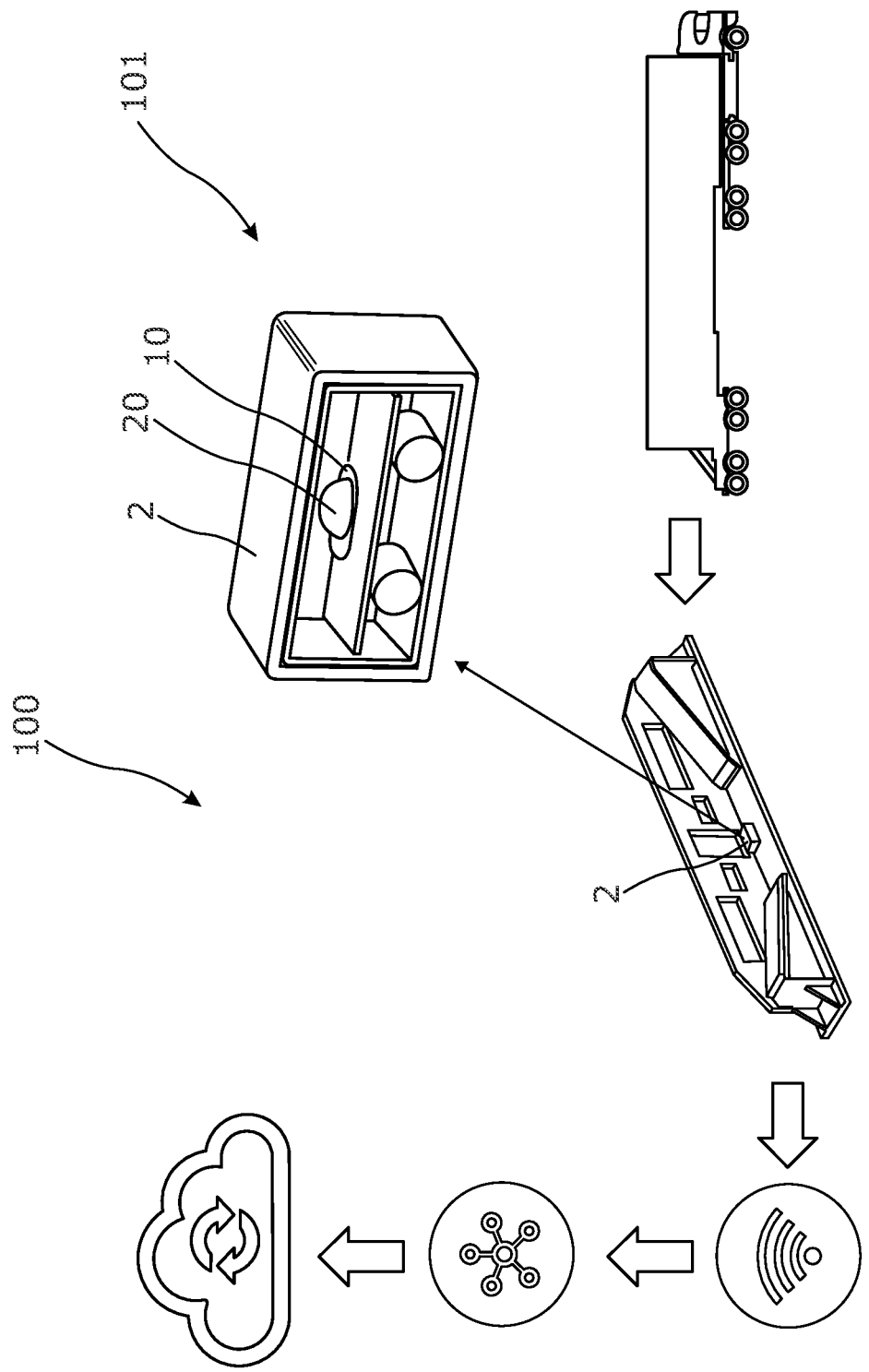
Figure 8:
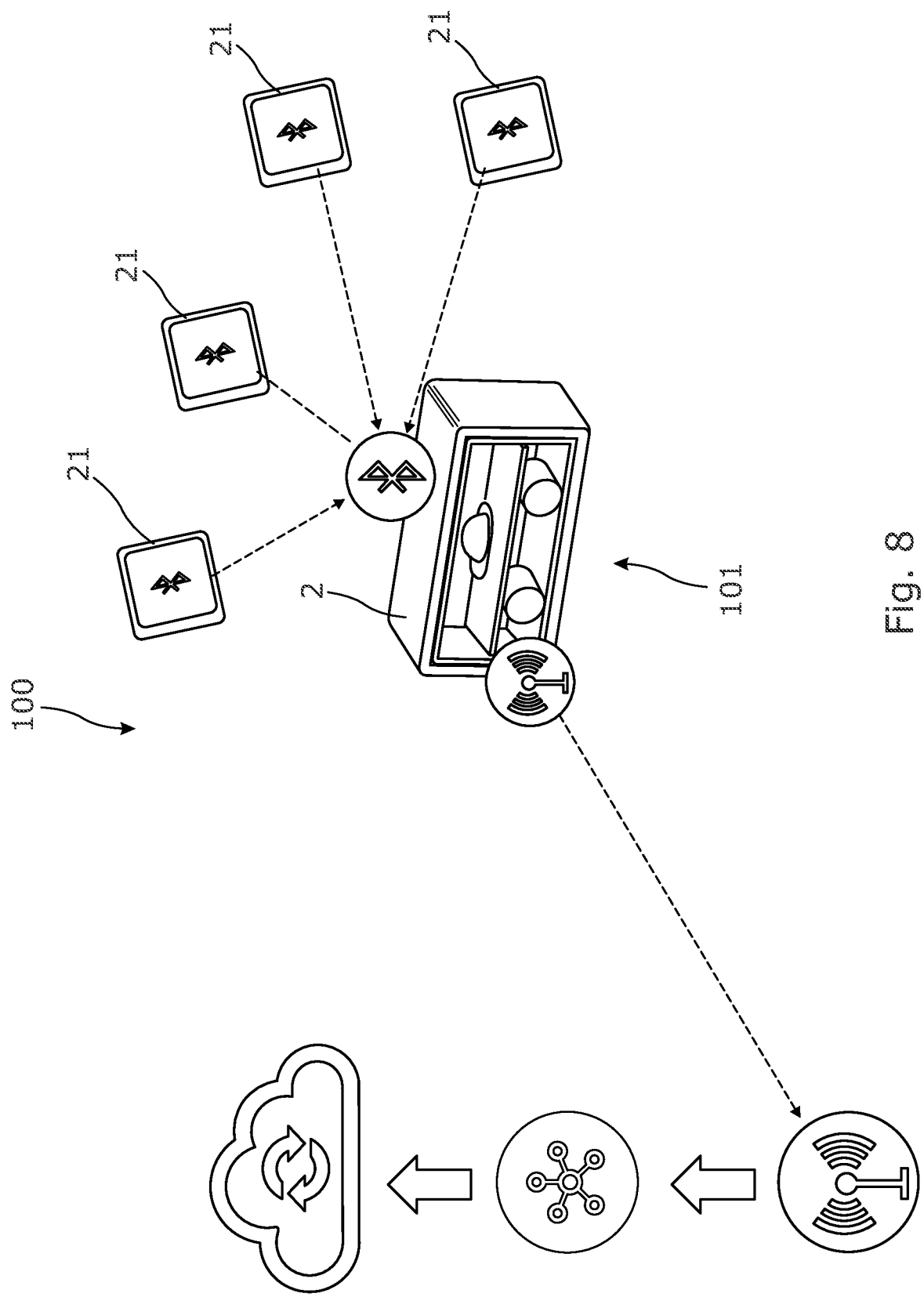
Figure 9A:
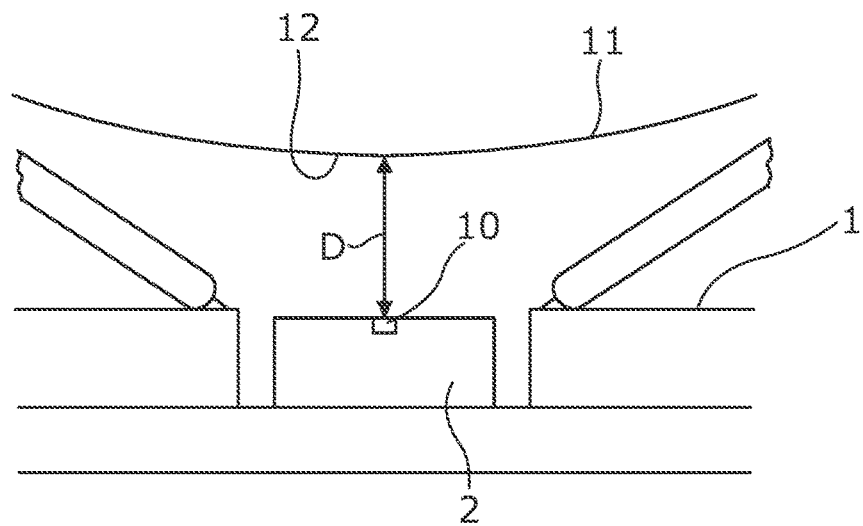
Figure 9B:
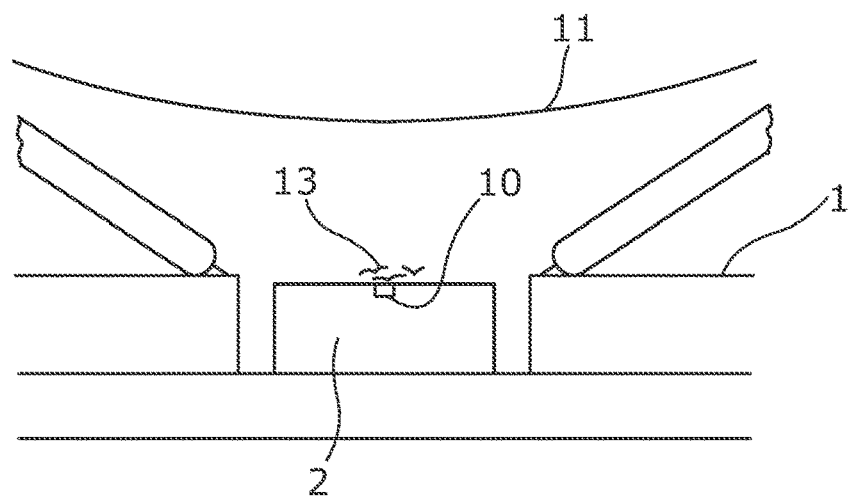
Figure 9C:
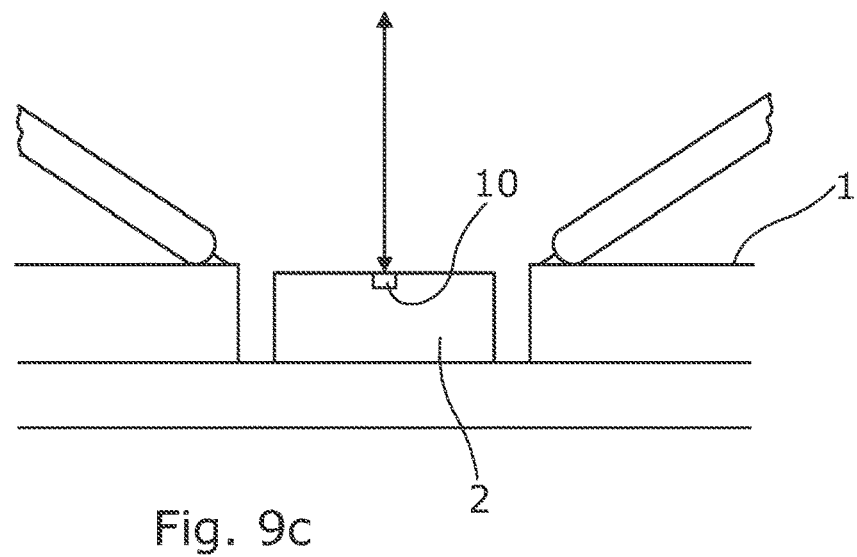
Figure 10:
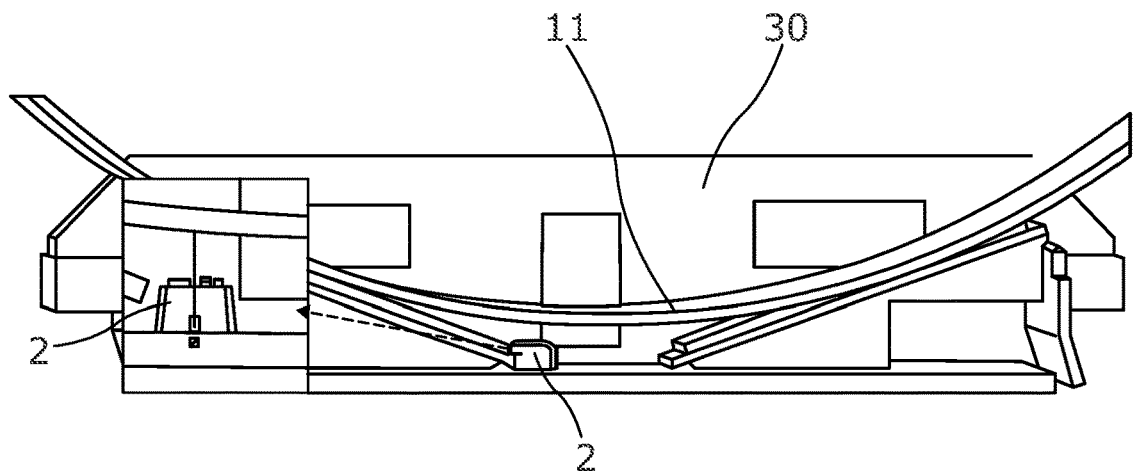
Figure 11:
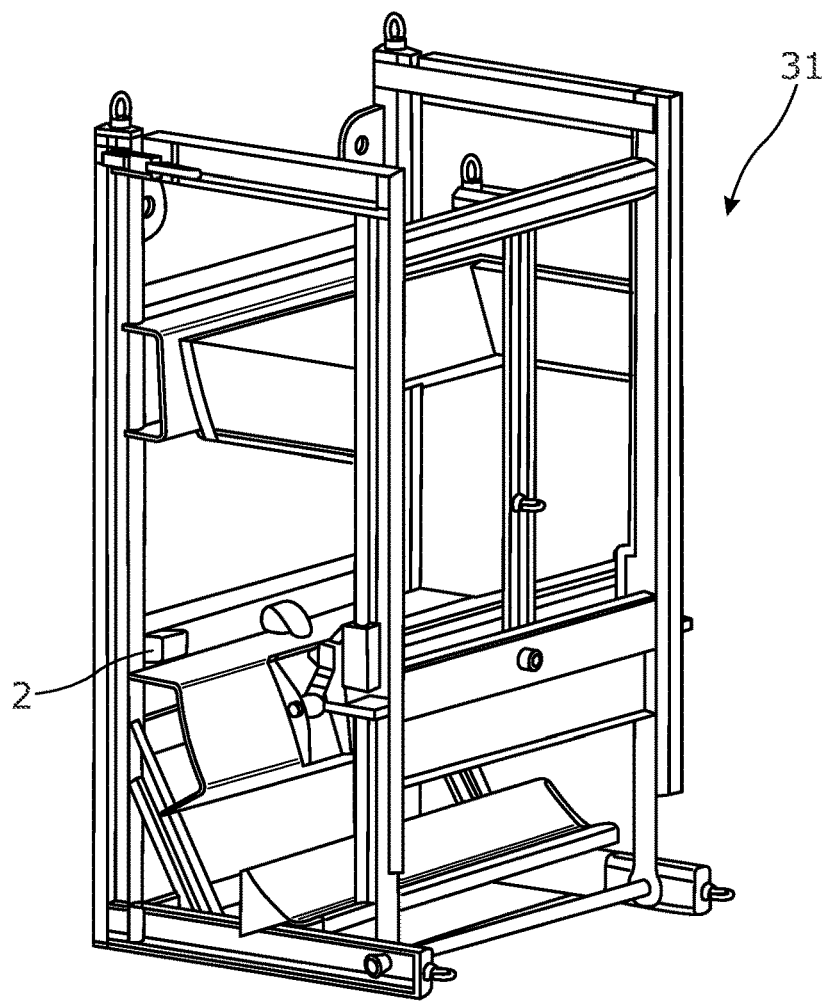
Figure 12:
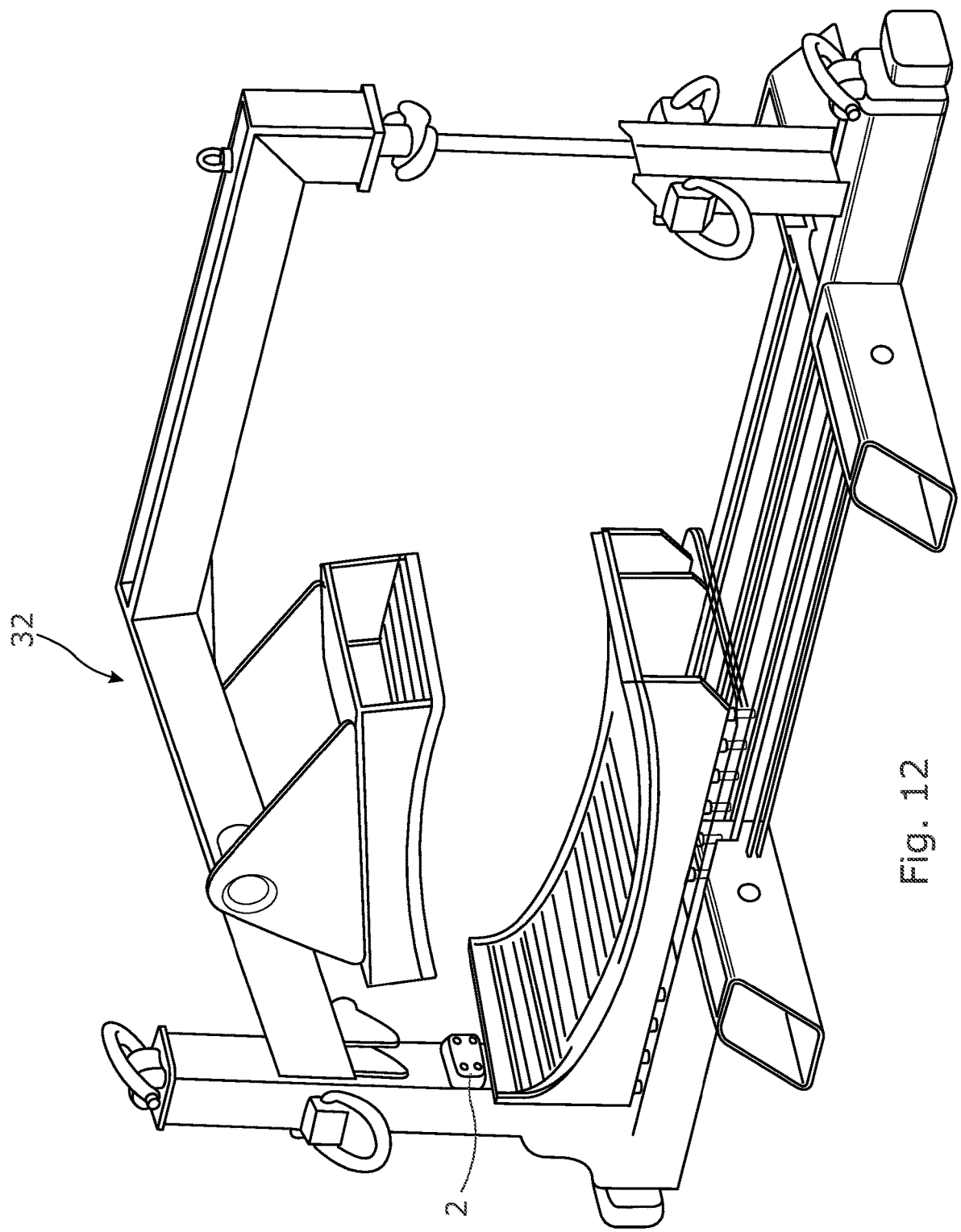

The invention and its many advantages will be described in more detail below with reference to the accompanying schematic drawings, which for the purpose of illustration show some non-limiting embodiments and in which FIG. 1 shows a wind turbine storage and/or transport system according to the invention, FIG. 2 shows a first embodiment of a detector device, FIGS. 3 and 4 show different embodiments for detecting a distance, FIG. 5 shows a second embodiment of a detector device, FIG. 6 shows a third embodiment of a detector device, FIG. 7 shows another wind turbine storage and/or transport system, FIG. 8 shows yet another wind turbine storage and/or transport system, FIGS. 9*a*-9*c* show different situations of detection, and FIGS. 10-12 show different wind turbine storage and/or transport equipment with a detector device arranged.

All the figures are highly schematic and not necessarily to scale, and they show only those parts which are necessary in order to elucidate the invention, other parts being omitted or merely suggested.

FIG. 1 shows a wind turbine storage and/or transport system 100 according to the invention. The wind turbine storage and/or transport system 100 comprises a wind turbine storage and/or transport equipment 1 and at least one wind turbine component 11 such as a wind turbine blade, a tower section, a nacelle, a gearbox, or parts thereof. The wind turbine storage and/or transport equipment 1 being configured to support the wind turbine component 11. In FIG. 1, the wind turbine component 11 is a tower section. According to the invention, an in-use/not in-use system 101 is arranged in connection with the wind turbine storage and/or transport equipment 1. The in-use/not in-use system 101 comprises one or more detector device(s) 2 being configured to determining a presence of the wind turbine component 11 in or on the wind turbine storage and/or transport equipment 1. The in-use/not in-use system is configured to determine, on basis of the determined presence of the wind turbine component 11, that the wind turbine storage and/or transport equipment 1 is in-use or not in-use.

The in-use/not in-use system 101 comprises the one or more detector device(s) 2 being mounted on or at the wind turbine storage and/or transport equipment 1, and is also shown in an enlarged view in FIG. 1. The one or more detector device(s) 2 may have an identification 3 so that the detector device 2 may be proper identified. The one or more detector device(s) 2 furthermore may have a positioning unit 4, a communication unit 5 configured to communicate data and/or a power supply unit 6.

The in-use/not in-use system 101 may also comprise a storage device 7 configured to store data communicated from the one or more detector device(s) 2 regarding position of the one or more detector device(s) 2. The stored data from the one or more detector device(s) 2 may be accessible via a user interface 8.

The in-use/not in-use system 101 may also comprise a control unit 9. The control unit 9 may be part of the storage device 7. The storage device 7, the control unit 9 and/or the user interface 8 may be operatively connected.

The storage device 9 may be a cloud-based server implemented using any commonly known cloud-computing platform technologies, such as e.g. Amazon Web Services, Google Cloud Platform, Microsoft Azure, DigitalOcean, Oracle Cloud Infrastructure, IBM Bluemix or Alibaba Cloud. The cloud-based server may be included in a distributed cloud network that is widely and publicly available, or alternatively limited to an enterprise. Alternatively, the storage device may in some embodiments be locally managed as e.g. a centralized server unit. Other alternative server configurations may be realized, based on any type of client-server or peer-to-peer (P2P) architecture. Server configurations may thus involve any combination of e.g. web servers, database servers, email servers, web proxy servers, DNS servers, FTP servers, file servers, DHCP servers, to name a few.

The storage device 9 may be maintained by and/or configured as a cloud-based service, being included with or external to the cloud-based server. Connection to cloud-based storage device 9 may be established using DBaaS (Database-as-a-service). For instance, cloud-based storage device 9 may be deployed as a SQL data model such as MySQL, PostgreSQL or Oracle RDBMS. Alternatively, deployments based on NoSQL data models such as MongoDB, Amazon DynamoDB, Hadoop or Apache Cassandra may be used. DBaaS technologies are typically included as a service in the associated cloud-computing platform.

The storage device 9 may be a server having one or more drives, such as for instance solid state drives, or similar drives. The storage device 9 may also be a combination of a virtual server and a local hard drive.

Furthermore, the one or more detector device(s) 2 may comprise one or more sensor(s) 10 configured to detect a distance to and/or a load of a wind turbine component 11. In the present embodiment two sensors 10 are arranged in the detector device 2 for detecting a distance, which will further be described below.

In addition, the one or more sensor(s) 10 is/are configured to detect the distance and/or load at predetermined time intervals or being event-driven, and the detected distance and/or load may be communicated to the storage device 7 via the communication unit 5.

By the wind turbine storage and/or transport system 100 according to the invention it is possible to determine and detect the status of the wind turbine storage and/or transport equipment 1 to which it is connected and arranged. The status could be in-use or not in-use. This is especially relevant so that the operators will be able to determine whether the wind turbine storage and/or transport equipment in fact is in-use or not in-use. When the in-use/not in-use system 101 also comprises a positioning unit the operator will also be able to track and determine the position of the wind turbine storage and/or transport equipment 1. Furthermore, due to statutory requirement in many countries it is important for the owners of the wind turbine storage and/or transport equipment to be able to document the positions of the wind turbine storage and/or transport equipment in view of tax issues.

By applying the present invention, a wind turbine storage and/or transport system 100 is obtained wherein the use of the wind turbine storage and/or transport equipment 1 may be optimized, meaning that the specific wind turbine storage and/or transport equipment 1 may be observed so that it may be returned to reuse and thereby a higher coefficient of utilization for the specific wind turbine storage and/or transport equipment 1 is obtainable. The investment in new wind turbine storage and/or transport equipment 1 may also be minimized accordingly.

Furthermore, the storage device may be configured to log the data so that the historic data of a specific detector device may be accessible and can be analysed.

According to the invention, the one or more detector device(s) 2 may have a positioning unit for providing a position of the one or more detector device(s) 2 in combination with one or more sensors 10. Different sensors may be arranged in the one or more detector device(s) according to the purpose and circumstances.

The sensors may be an ultrasonic sensor, a Time of Flight sensor, an infrared sensor, a proximity sensor, a magnetometer sensor, a load cell sensor, a strain gauge, a radar sensor, a lidar sensor, an acceleration sensor, a photo sensor, or a combination thereof.

In FIG. 2, a first embodiment of a detector device 2 is shown schematically. The detector device 2 comprises two sensors being ultrasonic sensors 10. The ultrasonic sensors 10 are using ultrasonic sound for detecting a distance to a wind turbine component 11. Basically, the ultrasonic sensor is transmitting an ultrasonic sound towards the wind turbine component 11 being positioned opposite the ultrasonic sensor 10. This ultrasonic sound is reflected by a face 12 of the wind turbine component and returned and received by a microphone. At the same time, the ultrasonic sensor 10 has detected how long time has elapsed and on basis of the time span, the ultrasonic sensor 10 may provide a distance from the ultrasonic sensor 10 to the face 12 of the wind turbine component 11. This is also illustrated in FIG. 3 wherein the distance D is shown.

In the present embodiment shown in FIGS. 2 and 3, the detector device 2 detects the distance D between the sensors 10 and the face 12 of the wind turbine component 11 facing the sensors 10. This detection of a specific distance may be communicated with the data of the identification and the position of the detector device 2 to the storage device. This data is then processed by the control unit which can determine on basis of the distance, that the wind turbine storage and/or transport equipment 1 is in-use and has a specific position or if is not in-use. This information is stored in the storage device and is accessible for the operator via the user interface.

The communication unit is configured to communicate data comprising the identification of the detector device, position of the one or more detector device(s), a power level of the power supply and the distance and/or the load of the one or more sensor(s) at predetermined intervals or being event-driven. Depending on the application of the one or more detector device(s) 2 the predetermined intervals may be set to 4 hours, 12 hours, 24 hours, 36 hours or even longer for some applications. Indeed, other time intervals than the mentioned may be chosen in view of application and power supply. As mentioned, the communication unit may also communicate data by being event-driven.

Another example of a sensor may be a Time of Flight sensor. The Time of Flight sensor function substantially in the same manner as the ultrasonic sensor as shown in FIG. 3 in that it also detects a distance. However, it uses light instead of sound.

In FIG. 4 another embodiment of a sensor 10 is shown. This sensor is an infrared sensor or a proximity sensor and function substantially in the same manner as the Time of flight sensor mentioned above. The infrared sensor 10 is using infrared light which is emitted towards the face 12 of the wind turbine component 11 and reflected by the face 12 and returned and received by the infrared sensor 10. At the same time, the infrared sensor 10 has detected how long time has elapsed and on basis of the time span the infrared sensor 10 may provide a distance from the infrared sensor 10 to the face 12 of the wind turbine component 11.

In FIG. 5, another embodiment of the detector device 2 is shown. In the present embodiment the detector device is mounted on a wind turbine storage and/or transport equipment 1. The detector device 2 comprises a magnetometer sensor 10. The magnetometer sensor 10 is configured to detect and measure magnetism in different directions. Hence, when a magnetic wind turbine component is arranged in the wind turbine storage and/or transport equipment 1, the magnetometer sensor 10 detects the presence and communicate this detection to the storage device.

In FIG. 6 yet another embodiment of the detector device 2 is shown. In this embodiment the sensor 10 is a strain gauge or a load cell sensor. The strain gauge or load cell sensor is configured to detect the load of the wind turbine component 11 and on basis of this load data is communicated to the storage device. This data is then processed by the control unit which can determine on basis of the load that the wind turbine storage and/or transport equipment 1 is in-use or not in-use and/or has a specific position in the circumstance the in-use/not in-use system comprises a positioning unit. This information is stored in the storage device and is accessible for the operator via the user interface.

According to the invention, the one or more detector device(s) 2 may comprise two or more sensors for providing redundancy to the one or more detector device(s) 2. Furthermore, a combination of sensors may be used, for instance an ultrasonic sensor together with a strain gauge may be comprised in the one or more detector device(s) in which embodiment both distance and load may be detected. Other combinations of sensors are also feasible.

In another embodiment, the detector device may comprise a camera (not shown) configured to take a photo and/or video of the wind turbine storage and/or transport equipment, the camera may be configured to take a photo and/or video at predetermined time intervals or being event-driven. The photo and/or video may then be processed by for instance an image recognition software for determining a presence of the wind turbine component in or on the wind turbine storage and/or transport equipment for determining the status of the specific wind turbine storage and/or transport equipment. Also, the determining a presence of a wind turbine component may be performed by the operator by looking at the photo and/or video provided and thereby determining if the specific wind turbine storage and/or transport equipment is in-use or not in-use.

In yet another embodiment, the one or more detector device(s) may comprise a contact sensor (not shown) for detecting a physical contact between wind turbine storage and/or transport equipment and wind turbine component and hence determining the status of the specific wind turbine storage and/or transport equipment.

Additionally, the one or more detector device(s) may in an embodiment comprise a chip radio communication unit (not shown) being configured to establish a radio-frequency communication between a component chip arranged in or with the wind turbine component and an equipment chip arranged in the wind turbine storage and/or transport equipment for detecting the presence of the wind turbine component in or on the wind turbine storage and/or transport equipment and hence determining the status of the specific wind turbine storage and/or transport equipment. The chip radio communication unit is configured to communicate with the component chip and the equipment chip at predetermined time intervals or being event-driven.

In FIG. 7 another embodiment of the wind turbine storage and/or transport system 100 according to the invention is shown. The embodiment is substantially designed as described in connection with FIG. 1, however the one or more detector device(s) 2 of the in-use/not in-use system 101 comprises in present embodiment a radar sensor 10. The radar sensor 10 may be a pulsed coherent radar or a Frequency-Modulated Continuous Wave sensor, or a combination thereof. The detector device 2 is in FIG. 7 partly uncovered so that the interior of the detector device 2 is visible. During normal use, the detector device 2 is closed.

The radar sensor 10 may be a low power, high precision, pulsed short-range radar sensor. The radar sensor may be embedded with a radio and an antenna.

The radar sensor 10 may comprise a transmitter (not shown) being configured to sending radar pulses and a receiver (not shown) being configured receiving echoes. For minimising the power consumption, the radar sensor 10 may be configured to shut down the transmitter between radar pulses. Hence, the radar sensor 10 may be configured to only consume power while sending the radar pulse and when receiving the echo.

The distance to the wind turbine component is calculated by measuring a time from when the radar pulse is sent to when the radar echo is received.

Furthermore, a lens 20 is arranged in connection with the radar sensor 10, the lens 20 is configured to control a direction of the radar pulses so that it is determined which direction a distance is to be detected.

In addition, by incorporating the radar sensor 10 in the detector device 2, no aperture or openings for the sensor in the detector device is necessary. Hence, the casing of the detector device may be watertight. Also, the robustness of the detector device may be enhanced since the radar sensor 10 is operatively by radio band and may function without interference from sound, noise, dust, colour nor direct or indirect light.

The radar sensor 10 may also be configured to detect materials, for instance by detecting materials with different dielectric constants.

In FIG. 8 another embodiment the wind turbine storage and/or transport system 100 according to the invention is shown. The wind turbine storage and/or transport system 100 has the same components as previously described. In the present embodiment the one or more detector device(s) 2 of the in-use/not in-use system 101 is connected with a plurality of secondary sensors 21. The secondary sensors 21 may be humidity sensor, acceleration sensor, gas sensor, temperature sensor, UV sensor, or a combination thereof. The secondary sensors 21 may be arranged in the vicinity of the one or more detector device(s) 2 for sensing or detecting different properties or environmental data and communicating it to the one or more detector device(s) 2, for instance by a Bluetooth connection or other long range communication technologies such for instance a LoRa network. In the present embodiment, the detector device 2 communicate the additional data from the secondary sensors 21 to the storage device. This data is then processed by the control unit and the information may be stored in the storage device and is accessible for the operator via the user interface.

Furthermore, the one or more detector device(s) 2 may also comprise a temperature sensor. The temperature sensor may detect or measure the temperature of the one or more detector device(s) 2 itself and/or the surroundings. These temperatures may be communicated to the storage device with the other data.

The one or more detector device(s) 2 may be operable in temperatures from −40 degrees to 60 degrees Celsius.

Furthermore, the one or more detector device(s) is/are watertight whereby it is protected from the environment and its climate and humidity. Advantageously, the one or more detector device(s) is/are maintenance free. Also, the one or more detector device(s) may be made of a polyurethane (PU or PUR), Thermoplastic Polyurethane (TBU) or Acrylonitrile butadiene styrene (ABS) material or a combination or mixtures thereof.

As mentioned above, the one or more detector device(s) and the control unit may be operatively connected meaning that the data communicated from the one or more detector device(s) to the storage device may be processed by the control unit. Mostly, the one or more detector device(s) transmit data to the storage device and thereby the control unit, however, in some circumstances the control unit may be configured to communicate data to the one or more detector device(s) for instance when updating settings, firmware, or by an event-driven circumstance, etc.

The positioning unit may be a Global Navigation Satellite System (GNSS). The positioning unit may also be based on Global Position System (GPS), the positioning unit may determine the position by local identification of mobile telephone network positions, or by internet network position or by a combination thereof.

Furthermore, the communication unit may be configured to communicate with a low power, long range (LR), wireless wide area network (LPWAN), such as NB-IoT, Sigfox, LoRa, ZigBee, Z-Wave, Wireless M-bus, Bluetooth, GPRS, GSM, 3G, 4G, 5G, nG, NFC, or similar wireless technology.

Moreover, the communication unit may be configured to communicate via fully or partly a wireless mesh network (WMN).

In an embodiment the communication unit comprises an operator driven gateway and/or an open-source driven gateway.

Also, the communication unit may be configured to function as a local gateway.

The identification is a unique number or tag for the specific detector device so that this can be identified in the user interface. The identification may also include information about the wind turbine storage and/or transport equipment to which they are mounted and/or connected so that these are connected and accessible in the user interface.

The detector device may also have a RFID tag or a label enabling nearby identification. A barcode or similar tag may be arranged on the outside of the detector device for ensuring proper identification.

Advantageously, the power supply unit may be a battery pack being incorporated in the detector device itself. The battery pack is preferably able to keep the detector device running for approximately 7 years and preferable more.

In this regard, the detector device may be configured to go into an idle mode for a predetermined time when the communication unit is unable to communicate. In this circumstance the battery life is conserved.

The user interface may comprise an overview part and a widget part, outputs an operation status and position of the previously registered detector devices. The control unit is configured to ensure that the data in the storage device may be accessible from the user interface in a predetermined manner so that the operation status, position and/or power supply level of the previously registered detector devices can be identified.

Preferably, the user interface will be accessible through the internet so that the data received from the detector devices may be accessible from any remote location.

Furthermore, the user interface may comprise a visual map, preferably worldwide, thereby providing an overview over the data of the detector devices connected with the system. Icons may be provided on the map for symbolizing the location/position of the detector devices. Together with the position information regarding the wind turbine storage and/or transport equipment is free (i.e. not in-use, in-use, etc.) is provided.

Other functions may be provided in the user interface, for instance the option of reserving a wind turbine storage and/or transport equipment in a specific time slot. In addition, historic data of specific detector device may be analysed for providing insight of the condition of the wind turbine storage and/or transport equipment over time.

In FIGS. 9a-9c different situations of detection are shown. In the shown embodiments the sensors arranged in the detector device 2 are ultrasonic sensors 10 detecting the distance to a wind turbine component 11. In FIG. 9a, the ultrasonic sensor 10 is transmitting an ultrasonic sound towards the wind turbine component 11 being positioned opposite the ultrasonic sensor 10. This ultrasonic sound is reflected by the face 12 of the wind turbine component and returned and received by a microphone. At the same time, the ultrasonic sensor 10 has detected how long time has elapsed and on basis of the time span the ultrasonic sensor 10 may provide the distance D from the ultrasonic sensor 10 to the face 12 of the wind turbine component 11. In FIG. 9b, the ultrasonic sensor 10 is covered by dirt, leaves 13, snow or similar and thereby the ultrasonic sound is blocked or at least detects a little distance. Hence, the detector device 2 is not able to detect the distance to the wind turbine component 11. In FIG. 9c, the wind turbine component is not present in the wind turbine storage and/or transport equipment 1. The ultrasonic sensor 10 transmits the ultrasonic sound however it is not reflected by the wind turbine component or detects a large distance.

Hence, the control unit in the above-mentioned FIGS. 9a-9c may be configured to determine on basis of the detected distance one of the following situations:

- the one or more sensors are covered as seen in FIG. 9b,
- the wind turbine storage and/or transport equipment is in-use as seen in FIG. 9a,
- the wind turbine storage and/or transport equipment is in a stacked position (not shown),
- the wind turbine storage and/or transport equipment is not in-use as seen in FIG. 9c.

These statuses/information are then accessible for the operator in the user interface.

Depending on the application the sensor may be configured to detect a distance up to at least 100 cm with an accuracy of approximately 5 cm or lower.

In other embodiments the in-use/not in-use system determines if the wind turbine storage and/or transport equipment is in use or not in use on basis of the one or more detector devices detecting either distance and/or load, the photo and/or video taken, the physical contact and/or by radiofrequency communication between component chips and equipment chips.

Furthermore, the wind turbine storage and/or transport equipment may be a carrier, cradle, jig, support part, each being configured to support a wind turbine component during transport and/or during storage. The wind turbine storage and/or transport equipment may be used to transport wind turbine components from one site to another, or within the same site.

The wind industry is transporting and carrying many heavy elements and the wind turbine storage and/or transport equipment used for this transport is rather expensive. By mounting and/or arranging one or more detector device (s) of the in-use/not in-use system 101 of the wind turbine storage and/or transport system 100 according to the present invention on each wind turbine storage and/or transport equipment it is possible for the operator to monitor the status of each wind turbine storage and/or transport equipment and/or position. This may be performed at predetermined time intervals or continuously or being event-driven. Hereby the operators can collect the free wind turbine storage and/or transport equipment for new wind turbine storage and/or transport assignments whereby the wind industry may save time and especially costs compared to providing new wind turbine storage and/or transport equipment.

In FIGS. 10 to 12 different wind turbine storage and/or transport equipment are shown. In FIG. 10, a transport cradle 30 for support and transportation of for instance a wind turbine tower is shown. The detector device 2 is arranged on the cradle 30 opposite the wind turbine component 11 being the wind turbine tower section.

FIG. 11 shows one embodiment of a wind turbine storage and/or transport equipment 31 for a wind turbine blade. The detector device 2 is arranged for detecting whether the wind turbine storage and/or transport equipment is in-use or not in-use and/or the position of the wind turbine storage and/or transport equipment 31. FIG. 12 shows another embodiment of a wind turbine storage and/or transport equipment 32 for a wind turbine blade. The wind turbine storage and/or transport equipment 32 also have one or more detector device(s) arranged on the equipment.

The one or more detector device(s) may be configured to be arranged directly on the wind turbine storage and/or transport equipment. The one or more detector device(s) may also be embedded in for instance a transportation mat or similar support parts.

Furthermore, one or more secondary sensor(s) may also be mounted or arranged to or embedded in a transportation mat or similar support parts. In one embodiment, an UV sensor is mounted to or embedded in a transportation mat so that it may be monitored how much light (UV) the transportation mat has been exposed to and thereby it may be decided when a specific transportation mat shall be replaced. The one or more secondary sensor(s) may also be mounted to or be arranged in the one or more detector device(s).

The present invention also relates to an in-use/not in-use system configured to form part of the wind turbine storage and/or transport system as described above.

The present invention additionally relates to a method for identifying a status of a wind turbine storage and/or transport equipment in a wind turbine storage and/or transport system as described above, comprising

- arranging one or more detector device(s) of an in-use/not in-use system in relation to a wind turbine storage and/or transport equipment, and
- determining a presence of a wind turbine component in or on the wind turbine storage and/or transport equipment.

The method may also comprise determining, on basis of the determined presence of the wind turbine component, that the wind turbine storage and/or transport equipment is in-use or not in-use.

Furthermore, the method may also comprise one or more of the following steps:

- detecting a position of the one or more detector device(s) having an identification,
- communicating status, identification and/or position to a storage device at predetermined intervals or being event-driven,
- storing data regarding status, identification and/or position.

Furthermore, the method may comprise making the data available by means of a user interface so that wind turbine storage and/or transport equipment may be tracked in real-time or at the predetermined time intervals or being event-driven, via the detector device.

Although the invention has been described in the above in connection with preferred embodiments of the invention, it will be evident for a person skilled in the art that several modifications are conceivable without departing from the invention as defined by the following claims.

The invention claimed is:

1. A wind turbine storage and/or transport system comprising:
   a wind turbine storage and/or transport equipment;
   an in-use/not in-use system to be arranged in connection with the wind turbine storage and/or transport equipment;
   the wind turbine storage and/or transport equipment being configured to support at least one wind turbine component, wherein the in-use/not in-use system is configured to determine a status of the wind turbine storage and/or transport equipment and comprises one or more detector device(s) being configured to determine a presence of the at least one wind turbine component in or on the wind turbine storage and/or transport equipment, wherein the one or more detector device(s) comprise at least one of the following:
   a camera configured to take a photo and/or video of the wind turbine storage and/or transport equipment, the camera is configured to take a photo and/or video;
   a contact sensor for detecting a physical contact between the wind turbine storage and/or transport equipment and at least one wind turbine component;

a chip radio communication unit configured to establish a radio-frequency communication between a component chip arranged in the at least one wind turbine component and an equipment chip arranged in the wind turbine storage and/or transport equipment for detecting the presence of the at least one wind turbine component in or on the wind turbine storage and/or transport equipment; and one or more sensor(s) configured to detect a distance to, and/or a load of, the at least one wind turbine component;

wherein the one or more detector device(s) further comprises:
a communication unit configured to communicate data;
a positioning unit for providing a position(s) of the one or more detector device(s); and
an identification that enables identification of the one or more detector device(s); and wherein the data communicated by the communication unit comprises status of the wind turbine storage and/or transport equipment, the identification of the one or more detector device(s), and the position of the one or more detector device(s) at predetermined intervals or being event-driven.

2. The wind turbine storage and/or transport system according to claim 1, wherein the one or more detector device(s) is configured to determine, on basis of the determined presence of the at least one wind turbine component, that the wind turbine storage and/or transport equipment is in-use or not in-use.

3. The wind turbine storage and/or transport system according to claim 1, wherein when the one or more detector device(s) is the camera, the camera is configured to detect the presence of the at least one wind turbine component in or on the wind turbine storage and/or transport equipment at predetermined time intervals or being event-driven.

4. The wind turbine storage and/or transport system according to claim 1, wherein the one or more sensors is/are an ultrasonic sensor, a Time of Flight sensor, an infrared sensor, a proximity sensor, a magnetometer sensor, a load cell sensor, a strain gauge, a radar sensor, a lidar sensor, an acceleration sensor, a photo sensor or any combination thereof.

5. The wind turbine storage and/or transport system according to claim 4, wherein the radar sensor is a pulsed coherent radar or a Frequency-Modulated Continuous Wave sensor, or a combination thereof.

6. The wind turbine storage and/or transport system according to claim 4, wherein the radar sensor comprises a transmitter configured to sending radar pulses and a receiver configured receiving echoes.

7. The wind turbine storage and/or transport system according to claim 1, wherein the one or more detector device(s) comprises a power supply.

8. The wind turbine storage and/or transport system according to claim 1, wherein the wind turbine storage and/or transport equipment being configured to support the at least one wind turbine component during transport and/or storage of the at least one wind turbine component.

9. The wind turbine storage and/or transport system according to claim 1, wherein the in-use/not in-use system comprises a storage device configured to store data communicated from the one or more detector device(s) regarding status of the wind turbine storage and/or transport equipment and/or position of the detector device.

10. The wind turbine storage and/or transport system according to claim 1, wherein wind turbine storage and/or transport equipment is a carrier, a cradle, a jig or a support part.

11. The wind turbine storage and/or transport system according to claim 1, wherein the at least one wind turbine component is a wind turbine blade, a wind turbine blade section, a tower section, a nacelle, a drive train, or parts thereof.

12. The wind turbine storage and/or transport system according to claim 1, wherein the one or more detector device(s) is a camera configured to take a photo and/or video of the wind turbine storage and/or transport equipment, the camera is configured to take a photo and/or video.

13. The wind turbine storage and/or transport system according to claim 1, wherein the one or more detector device(s) is a contact sensor for detecting a physical contact between the wind turbine storage and/or transport equipment and at least one wind turbine component.

14. The wind turbine storage and/or transport system according to claim 1, wherein the one or more detector device(s) is a chip radio communication unit configured to establish a radio-frequency communication between a component chip arranged in the at least one wind turbine component and an equipment chip arranged in the wind turbine storage and/or transport equipment for detecting the presence of the at least one wind turbine component in or on the wind turbine storage and/or transport equipment.

15. The wind turbine storage and/or transport system according to claim 1, wherein the one or more detector device(s) is one or more sensor(s) configured to detect a distance to, and a load of, the at least one wind turbine component.

16. An in-use/not in-use system configured to form part of a wind turbine storage and/or transport system comprising:
a wind turbine storage and/or transport equipment;
an in-use/not in-use system to be arranged in connection with the wind turbine storage and/or transport equipment;
the wind turbine storage and/or transport equipment being configured to support at least one wind turbine component, wherein the in-use/not in-use system is configured to determine a status of the wind turbine storage and/or transport equipment and comprises one or more detector device(s) being configured to determine a presence of the at least one wind turbine component in or on the wind turbine storage and/or transport equipment, wherein the one or more detector device(s) comprise at least one of the following:
a camera configured to take a photo and/or video of the wind turbine storage and/or transport equipment, the camera is configured to take a photo and/or video;
a contact sensor for detecting a physical contact between the wind turbine storage and/or transport equipment and at least one wind turbine component;
a chip radio communication unit configured to establish a radio-frequency communication between a component chip arranged in the at least one wind turbine component and an equipment chip arranged in the wind turbine storage and/or transport equipment for detecting the presence of the at least one wind turbine component in or on the wind turbine storage and/or transport equipment; and
one or more sensor(s) configured to detect a distance to, and/or a load of, the at least one wind turbine component;

wherein the one or more detector device(s) further comprises:
a communication unit configured to communicate data;
a positioning unit for providing a position(s) of the one or more detector device(s); and
an identification that enables identification of the one or more detector device(s); and
wherein the data communicated by the communication unit comprises: status of the wind turbine storage and/or transport equipment, the identification of the one or more detector device(s), and the position of the one or more detector device(s) at predetermined intervals or being event-driven.

17. A method for identifying a status of a wind turbine storage and/or transport equipment in a wind turbine storage and/or transport system comprising:
a wind turbine storage and/or transport equipment;
an in-use/not in-use system to be arranged in connection with the wind turbine storage and/or transport equipment;
the wind turbine storage and/or transport equipment being configured to support at least one wind turbine component, wherein the in-use/not in-use system is configured to determine a status of the wind turbine storage and/or transport equipment and comprises one or more detector device(s) being configured to determine a presence of the at least one wind turbine component in or on the wind turbine storage and/or transport equipment, wherein the one or more detector device(s) comprise at least one of the following:
a camera configured to take a photo and/or video of the wind turbine storage and/or transport equipment, the camera is configured to take a photo and/or video;
a contact sensor for detecting a physical contact between the wind turbine storage and/or transport equipment and at least one wind turbine component;
a chip radio communication unit configured to establish a radio-frequency communication between a component chip arranged in the at least one wind turbine component and an equipment chip arranged in the wind turbine storage and/or transport equipment for detecting the presence of the at least one wind turbine component in or on the wind turbine storage and/or transport equipment; and
one or more sensor(s) configured to detect a distance to, and/or a load of, the at least one wind turbine component;
wherein the one or more detector device(s) further comprises:
a communication unit configured to communicate data;
a positioning unit for providing a position(s) of the one or more detector device(s); and
an identification that enables identification of the one or more detector device(s); and
wherein the data communicated by the communication unit comprises status of the wind turbine storage and/or transport equipment, the identification of the one or more detector device(s), and the position of the one or more detector device(s) at predetermined intervals or being event-driven;
the method comprising
arranging the one or more detector device(s) of the in-use/not in-use system in relation to a wind turbine storage and/or transport equipment, and
determining a presence of at least one wind turbine component in or on the wind turbine storage and/or transport equipment;
determining the status of the wind turbine storage and/or transport equipment; and
communicating the data communicated by the communication unit.

18. The method according to claim 17 further comprising determining, on a basis of the determined presence of the at least one wind turbine component, that the wind turbine storage and/or transport equipment is in-use or not in-use.

* * * * *